United States Patent
Hijiri et al.

(10) Patent No.: US 6,741,252 B2
(45) Date of Patent: May 25, 2004

(54) ANIMATION DATA COMPRESSION APPARATUS, ANIMATION DATA COMPRESSION METHOD, NETWORK SERVER, AND PROGRAM STORAGE MEDIA

(75) Inventors: Toshiki Hijiri, Osaka (JP); Toshiya Naka, Osaka (JP); Shigeo Asahara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 205 days.

(21) Appl. No.: 09/784,173

(22) Filed: Feb. 16, 2001

(65) Prior Publication Data

US 2001/0020943 A1 Sep. 13, 2001

(30) Foreign Application Priority Data

Feb. 17, 2000 (JP) ........................ 2000-039509

(51) Int. Cl.[7] .............................................. G06T 15/00
(52) U.S. Cl. ...................................................... 345/473
(58) Field of Search ................................. 345/473–475, 345/428

(56) References Cited

U.S. PATENT DOCUMENTS 5,818,463 A     10/1998  Tao et al.
5,953,506 A  *  9/1999   Kalra et al. .................. 345/428

OTHER PUBLICATIONS

Greenberg et al ("Real Time 3D Animation Using Progressive Transmission": 1999 IEEE 0–7803–5579–2/99).*

* cited by examiner

*Primary Examiner*—Almis R. Jankus
(74) *Attorney, Agent, or Firm*—Wenderoth, Lind & Ponack, L.L.P.

(57) ABSTRACT

An animation data compression apparatus comprises an animation data classification unit for classifying animation data into plural kinds of data, an animation priority determination unit for determining priorities on the respective data classified, and an animation data compression unit for compressing the respective data while changing the compression ratio on the basis of the priorities. Therefore, even on a narrow-band network such as a telephone line, animation data of complicated CG contents can be transmitted in real-time without degrading smoothness of animation scene.

30 Claims, 10 Drawing Sheets

ANIMATION DATA COMPRESSION APPARATUS, ANIMATION DATA COMPRESSION METHOD, NETWORK SERVER, AND PROGRAM STORAGE MEDIA

FIELD OF THE INVENTION

The present invention relates to an apparatus and a method for compressing animation data as computer graphics (hereinafter referred to as CG) data, and a network server using the compression apparatus.

BACKGROUND OF THE INVENTION

In recent years, as the Internet has become widespread and the performance of personal computers (PC) has been enhanced, three-dimensional (3D) CG has been widely used on the Internet. As a standard language for 3D CG, VRML (Virtual Reality Modeling Language) 97 has already been standardized by ISO (International Standard Organization). Under the present circumstances, however, as the contents become more complex, the data size also increases. Accordingly, it takes much time to transmit 3D CG data on a narrow-band network.

In order to solve this problem, compression of 3D CG data is carried out, and this is a very important technology, especially when distributing 3D CG data on a network such as the Internet, by which the data transmission time is reduced and, moreover, real-time distribution is realized by setting the rate of animation playback (data quantity per unit time) lower than the transmission bandwidth.

3D CG data can be roughly divided into shape data describing a three-dimensional space and animation data describing a motion. In order to compress the shape data, a method of reducing the number of polygons which defines a space is generally used.

On the other hand, the animation data has a time axis, and it is generally represented as keyframe data. In a conventional apparatus or method for compressing animation data, the number of data is reduced by simply thinning out the keyframe data on the time axis, thereby compressing the data.

When distributing 3D CG data on a network such as the Internet, however, the above-mentioned simple compression method cannot realize real-time transmission/reception of animation data without degrading smooth motion of animation scene, on a narrow-band network such as a telephone line.

SUMMARY OF THE INVENTION

The present invention is made to solve the above-described problems and has for its object to provide an animation data compression apparatus and an animation data compression method, by which animation data of complicated CG contents can be transmitted in real time without degrading the smoothness of animation scene even on a narrow-band network such as a telephone line.

Another object of the present invention is to provide a network server using the above-described animation data compression apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an animation data compression apparatus comprises an animation data classification unit for classifying input data into plural kinds of animation data; an animation data priority determination unit for determining priorities on the plural kinds of animation data; and an animation data compression unit for compressing the plural kinds of animation data, on the basis of the priorities determined by the animation data priority determination unit. Therefore, even on a narrow-band network such as a telephone line, animation data can be transmitted in real time without degrading smoothness of animation scene.

According to a second aspect of the present invention, in the animation data compression apparatus of the first aspect, the animation data compression unit compresses the plural kinds of animation data, at their respective compression ratios, on the basis of the determined priorities. Thereby, the compression ratio of data having relatively low priority (i.e., not very important data) is increased, and the compression ratio of data having relatively high priority (i.e., important data) is reduced. Therefore, animation data can be compressed without degrading smoothness of animation scene, and distributed in real time.

According to a third aspect of the present invention, in the animation data compression apparatus of the first aspect, the input data includes data representing an animation scene of three-dimensional CG.

According to a fourth aspect of the present invention, in the animation data compression apparatus of the first aspect, the input data includes multidimensional stream data.

According to a fifth aspect of the present invention, in the animation data compression apparatus of the fourth aspect, the animation data priority determination unit determines a priority for each of data packets of the multidimensional stream data. Therefore, even when processing data whose priorities change considerably, these data can be compressed without degrading smoothness of animation scene, and transmitted in real time.

According to a sixth aspect of the present invention, in the animation data compression apparatus of the first aspect, the input data includes multidimensional stream data representing an animation scene of three-dimensional CG.

According to a seventh aspect of the present invention, in the animation data compression apparatus of the first aspect, the animation data priority determination unit determines the priorities on the basis of the hierarchical structure of a CG scene. Thereby, in each object, a highest priority is assigned to the most important part, and the priority is decreased with distance from the most important part. Therefore, animation data can be compressed without degrading smoothness of relatively important part of animation scene.

According to an eighth aspect of the present invention, in the animation data compression apparatus of the third aspect, the animation data priority determination unit determines the priorities on the basis of the positional relationship between a viewpoint and CG objects. Thereby, the highest priority is assigned to a CG object closest to the viewpoint, and the priority is decreased with distance from the viewpoint. Therefore, animation data can be compressed without degrading smoothness of animation scene corresponding to CG objects close to the viewpoint.

According to a ninth aspect of the present invention, in the animation data compression apparatus of the first aspect, the animation data priority determination unit determines the priorities on the basis of the amounts of change in CG objects per unit time. Thereby, the highest priority is assigned to a channel having the largest amount of change per unit time, and the priority is decreased as the amount of change per unit time decreases. Therefore, animation data can be compressed without degrading smoothness of animation scene corresponding to CG objects having relatively large amounts of change.

According to a tenth aspect of the present invention, in the animation data compression apparatus of the first aspect, the animation data priority determination unit determines intermediate priorities, based on each of at least two of (1) the hierarchical structure of a CG scene, (2) the positional relationship between a viewpoint and CG objects, and (3) the amounts of change in CG objects per unit time, and performs weighted addition of the respective intermediate priorities to determine final priorities. Thereby, more appropriate priorities can be obtained, and animation data can be compressed without degrading smoothness of important regions or objects in animation scene.

According to an eleventh aspect of the present invention, a network server for distributing CG contents including animation data, said network server having the animation data compression apparatus of Claim 1, compressing animation data by using the animation data compression apparatus, and distributing the compressed animation data. Therefore, even when the bit rate for transmitting animation data as stream data is larger than the transmission bandwidth, since the animation data is compressed, the animation data can be distributed in real time without overflow of data. Further, the data can be compressed without degrading smooth motion of animation scene.

DETAILED DESCRIPTION OF THE PREFERRED EMBODIMENTS

Embodiment 1

Hereinafter, an animation data compression apparatus and an animation data compression method according to a first embodiment of the present invention will be described with reference to the drawings.

Figure 1:
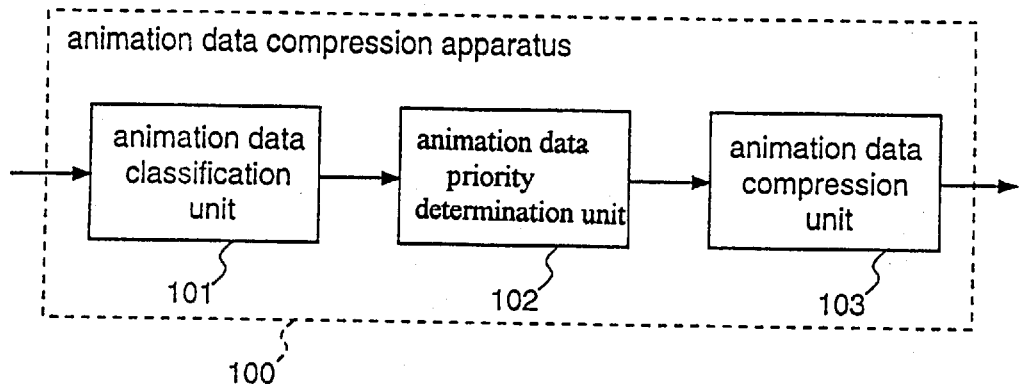
FIG. 1 is a block diagram illustrating the construction of an animation data compression apparatus according to a first embodiment of the present invention.

FIG. 1 is a block diagram illustrating the construction of an animation data compression apparatus 100 according to the first embodiment.

In FIG. 1, the animation data compression apparatus 100 comprises an animation data classification unit 101, an animation data priority determination unit 102, and an animation data compression unit 103.

The animation data classification unit 101 classifies animation data into plural kinds of data.

Figure 2:
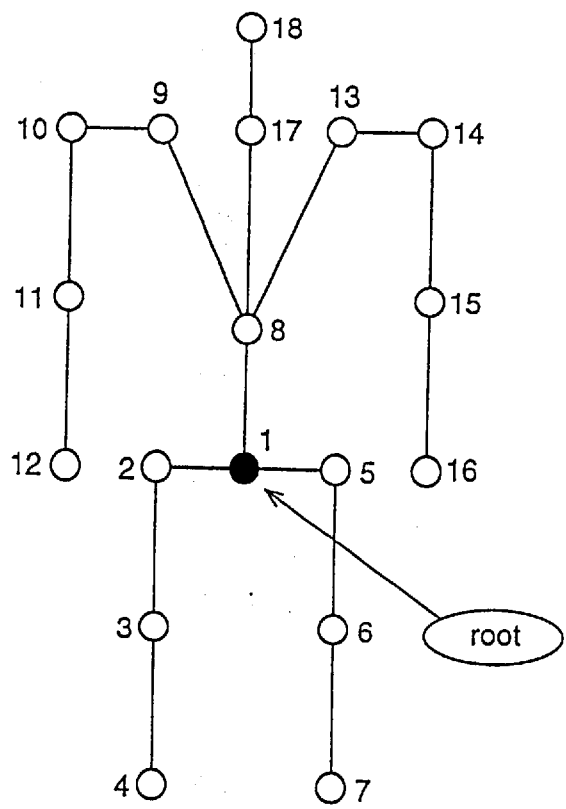
FIG. 2 is a diagram illustrating the skeletal structure of a 3D CG character according to the first embodiment.

FIG. 2 is a diagram illustrating a skeleton structure of a 3D CG character. The 3D CG character shown in FIG. 2 is a humanoid skeleton, and the skeleton has eighteen joints. Joint 1 is called a root, representing a reference position of the body of the humanoid.

It is assumed that an animation data generation unit (not shown) generates data on a time axis, i.e., information of position, rotation, and scale, for each of the eighteen joints of the 3D CG character shown in FIG. 2, and these data are input to the animation data classification unit 101.

The animation data classification unit 101 classifies the input data into plural kinds of data. When the operation data of the 3D CG character as described above are input to the classification unit 101, since each of the eighteen joints has the three kinds of information, i.e., position, rotation, and scale, the input data is classified into fifty-four kinds of data. Hereinafter, the respective kinds are referred to as "channels". In this case, there are fifty-four channels. Other data than the information of position, rotation, and scale may be classified by the animation data classification unit 101.

Figure 3:
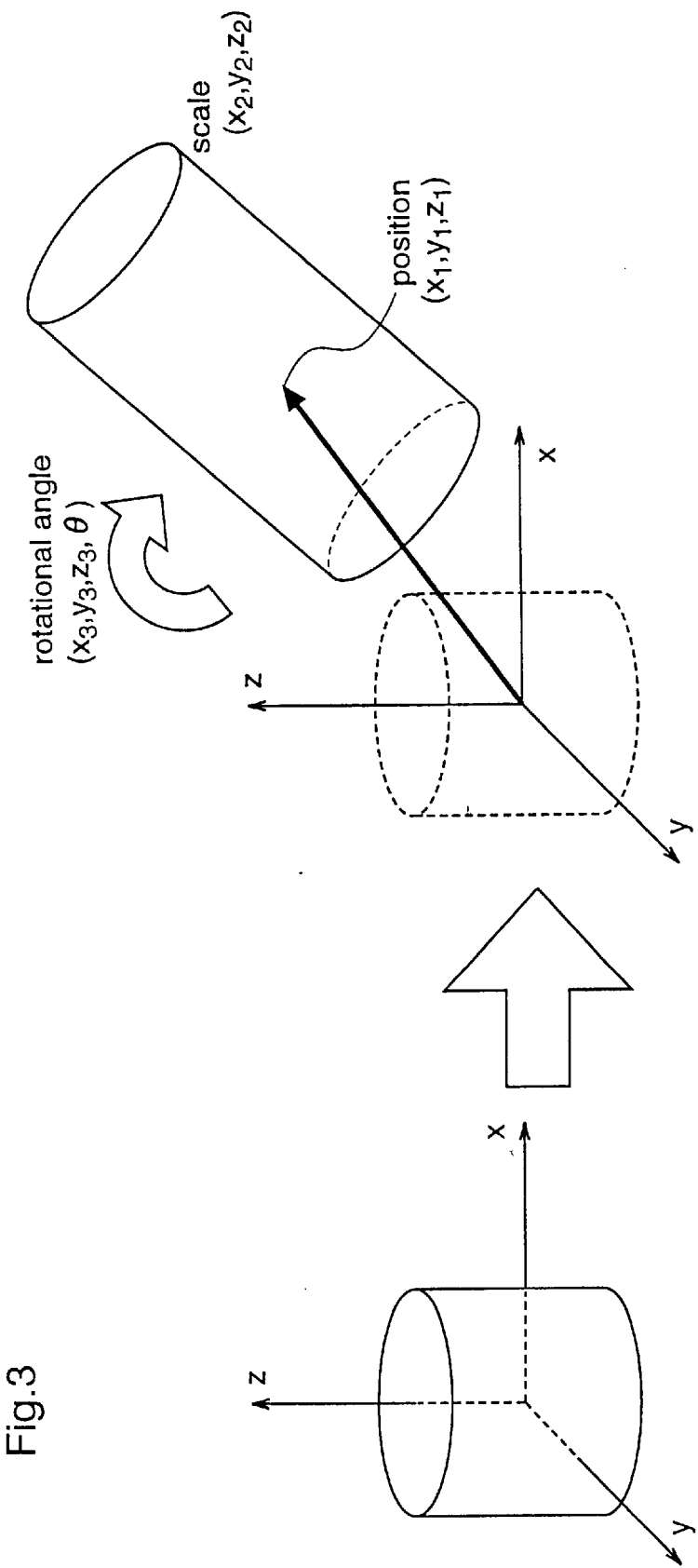
FIG. 3 is a diagram for explaining animation data according to the first embodiment.

FIG. 3 is a diagram for explaining animation data.

Animation data is data on a time axis required to generate an animation scene, such as information about the position, rotation, and scale of a CG object, the position of viewpoint, light sources, etc. The information of position indicates the position of a center point or the like of the CG object. The information of rotation relates to the amount of rotation, indicating how much degree the CG object rotates. The amount of rotation comprises coordinates $(x_3, y_3, z_3)$ indicating one vector in the 3D space, and an angle $\theta$ at which the CG object rotates around the vector. The information of scale indicates how much degree the CG object is scaled up or down.

The animation data may be either data representing a 3D CG animation scene or data representing a 2D (two-dimensional) animation scene. Alternatively, it may be file data, not stream data.

Multimedia stream data has time information and space information of multiple dimensions, and dimensions constituted by time and space dimensions are referred to as "multiple dimensions". For example, in the case of animation data of a CG character having a skeleton structure like a human being, information of each joint of the skeleton structure constitute one dimension. Further, each joint has information of position, rotation, scale, etc., and each of them constitutes one dimension. Furthermore, the position of each joint has data of x and y coordinates for a 2D space, or data of x, y, and z coordinates for a 3D space. Likewise, the rotation and the scale also have their respective dimensional data. These data and the time information constitute multidimensional stream data.

In the-case where the animation data is stream data, when a user is provided with the animation data, he/she can view an animation scene while successively reproducing the data.

However, in the case where the animation data is not stream data but file data, even-when a user is provided with the animation data, he/she cannot start playback until receiving all of the file data.

Figure 4:
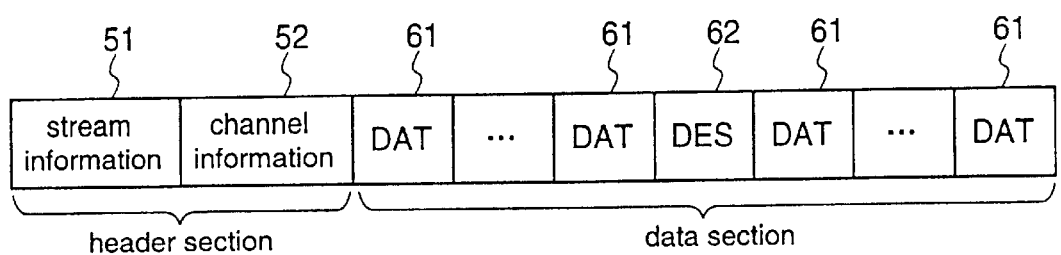
FIG. 4 is a diagram illustrating the structure of animation data as stream data according to the first embodiment.

FIG. 4 is a diagram illustrating an example of construction of animation data as stream data.

With reference to FIG. 4, the stream data is composed of a header section and a data section.

The header section is composed of stream information 51 and channel information 52. The stream information 51 is information indicating the start address of the data section, the length of the data section, the number of packets in the data section, etc. The header section may include version information, the size of the header section, etc. The channel information 52 is information relating to definition of all channels that will carry the data packets in the data section. The channel information 52 is also referred to as "a channel table". The channel table has the total number of channels that will carry the data packets in the data section, and definitions of the respective channels.

The data section of the stream data is composed of DAT packets 61 and a DES packet 62. The DAT packets 61 are data packets relating to animation data, and each DAT packet 61 is composed of data relating to all channels or predetermined channels among all channels. The DES packet 62 is a description packet to be transmitted when the channel table is altered. For the packets to be transmitted after the DES packet 62, the channel table of the DES packet 62 is used. The DES packet 62 is used when the channel structure is greatly changed during packet transmission or when a new object is suddenly introduced. If such event does not occur, the data section may have no DES packet 62.

The animation data priority determination unit 102 determines priorities of the respective data classified as channels by the animation data classification unit 101.

With respect to determination of intermediate priorities by the animation data priority determination unit 102, there are three methods based on "the hierarchical structure of a CG scene", "the positional relationship between the view point and CG objects", and "the amounts of change in CG objects per unit time", respectively. Hereinafter, the three methods will be described in detail.

[Determination of Intermediate Priorities Based on the Hierarchical Structure of a CG Scene]

Initially, a description will be given of the case where intermediate priorities of channels are determined on the basis of the hierarchical structure of a CG scene.

Figure 5:
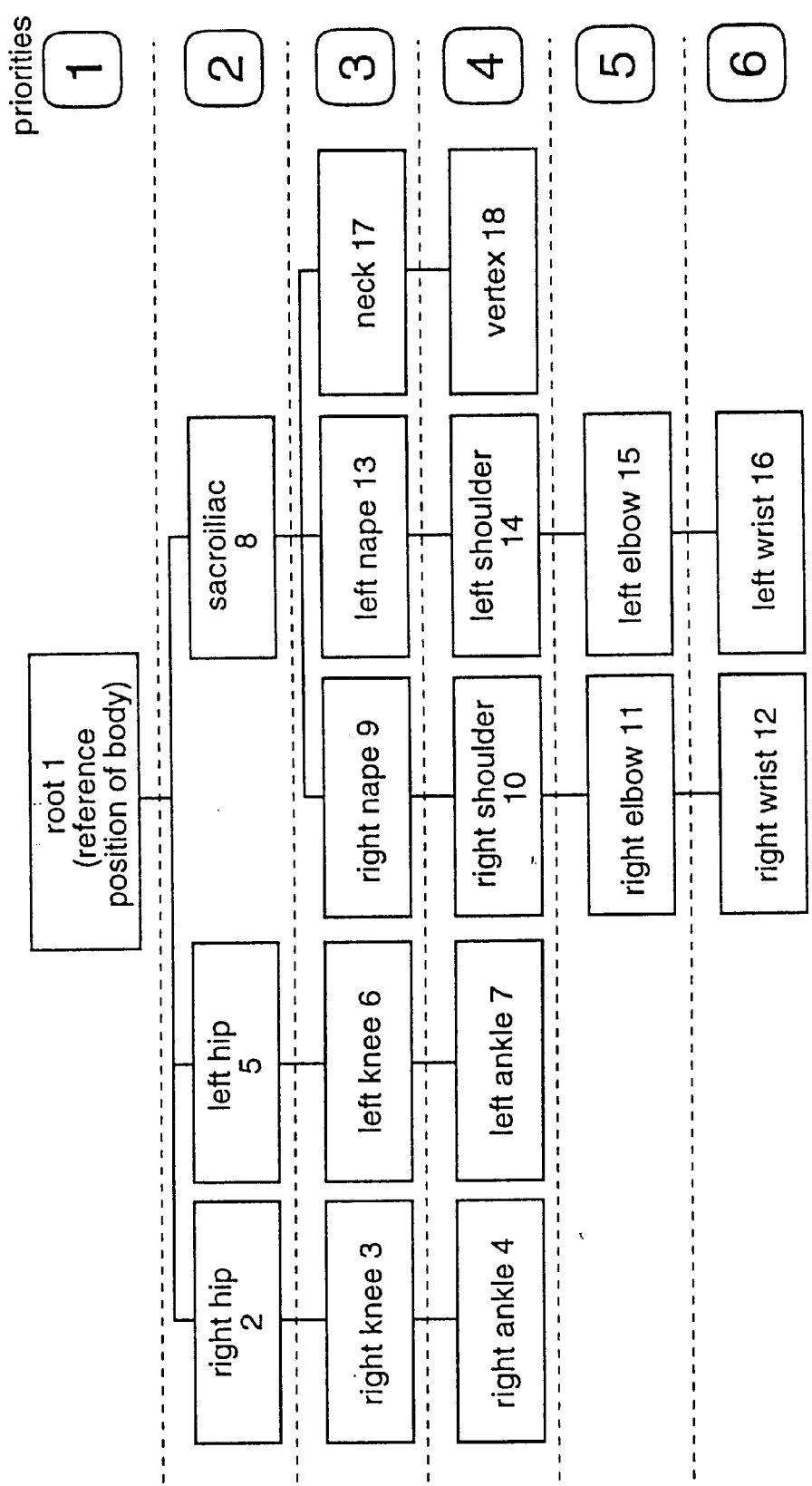
FIG. 5 is a diagram illustrating the hierarchical structure of the 3D CG character according to the first embodiment.

FIG. 5 is a diagram illustrating the hierarchical structure of the 3D CG character shown in FIG. 2, and this is an example of the hierarchical structure of a CG scene. In the case of the 3D CG character represented by the hierarchical structure shown in FIG. 5, generally an object named "root 1" indicating a reference point of the body is most important, and importance is gradually lowered toward the fingers and toes. That is, intermediate priorities of channels corresponding to the respective objects are determined on the precondition that the priority becomes lower as the hierarchy gets deeper.

For example, as shown in FIG. 5, when priorities are assigned to the respective objects starting from "1", the priority of root 1 is "1", the priority of sacroiliac 8 is "2", the priority of right nape 9 is "3", the priority of right shoulder 10 is "4", the priority of right elbow 11 is "5", and the priority of right wrist is "6".

Although FIG. 5 shows a relatively simple case, when an important object exists in the middle of the hierarchy, the user may designate this object to change assignment of priorities from this object.

[Determination of Intermediate Priorities Based on the Positional Relationship Between the Viewpoint and CG Objects]

Next, a description will be given of the case where intermediate priorities are determined on the bases of the positional relationship between the viewpoint and the CG object.

Figure 6:
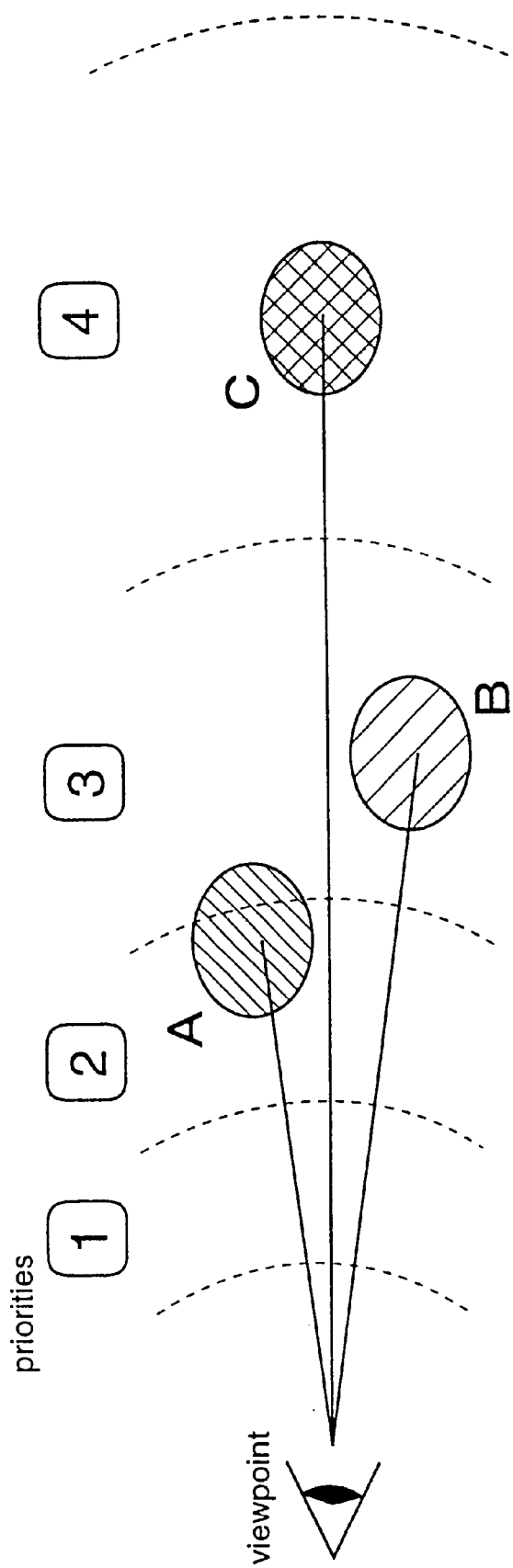
FIG. 6 is a diagram illustrating the positional relationship between the viewpoint and CG objects according to the first embodiment.

FIG. 6 is a diagram illustrating an example of positional relationship between the viewpoint and CG objects.

Utilizing the distances between the viewpoint and the respective CG objects, a higher priority is assigned to a CG object closer to the viewpoint, and a lower priority is assigned to a CG object farther from the viewpoint. For example, FIG. 6 shows a case where priorities are set so that the relationship between the distance and the priority becomes a logarithmic function. In FIG. 6, A, B, and C are either single CG objects or 3D CG characters each having a hierarchical structure. In the case of FIG. 6, priorities "2", "3", and "4" are assigned to A, B, and C, respectively.

Although, in this example, the relationship between the distance from the viewpoint and the priority is a logarithmic function, it may be a linear function or an exponential function.

Furthermore, although the data inputted to the animation data compression apparatus of this first embodiment may be either 2D CG data or 3D CG data as described above, since there is no conception of "viewpoint" with respect to 2D CG, when the input data is 2D CG data, intermediate priorities cannot be obtained on the based of the positional relationship between the viewpoint and CG objects.

[Determination of Intermediate Priorities Based on the Amounts of Change in CG Objects Per Unit Time]

Next, a description will be given of the case where intermediate priorities are determined on the basis of the amounts of change in CG objects per unit time.

In this case, a higher priority is assigned to a channel whose amount of change per unit time is larger.

Figure 7:
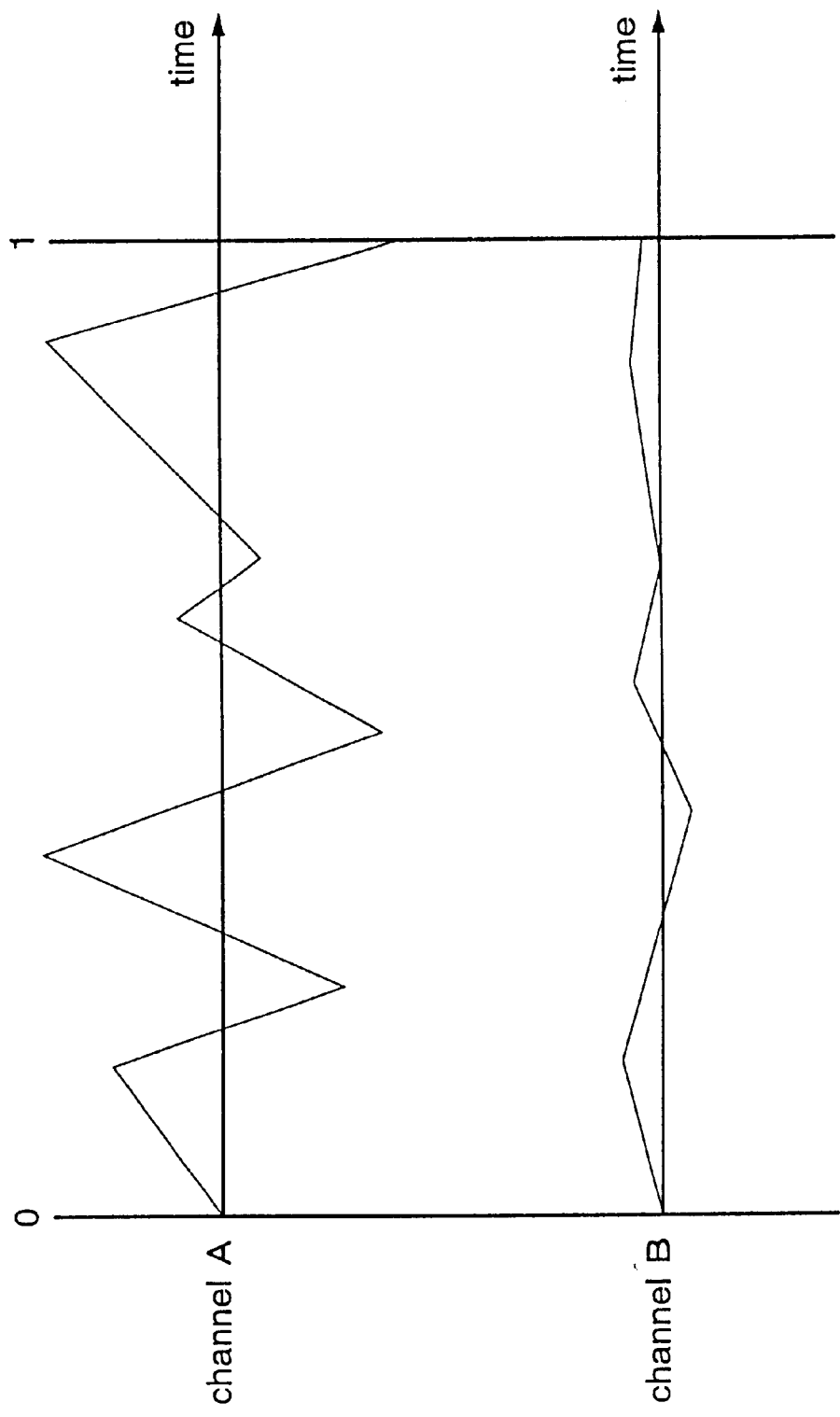
FIG. 7 is a diagram illustrating the amounts of change in channels per unit time according to the first embodiment.

FIG. 7 is a diagram illustrating the amounts of change in data of channels A and B per unit time. The abscissa shows the time, and the ordinate shows the data value.

In FIG. 7, the amount of change in data per unit time is larger in the channel A than in the channel B. In this case, a higher priority is assigned to the channel A whose amount of change is large,while a lower priority is assigned to the channel B whose amount of change is small.

The respective intermediate priorities, which have been determined on the basis of "the hierarchical structure of,a CG scene", "the positional relationship between the viewpoint and the CG objects", and "the amounts of change in the CG objects per unit time", are subjected to weighted addition, and the result is determined as final priorities. The weighted addition is to calculate the sum of the respective intermediate priorities after, multiplying them by predetermined parameters as weights. The user can arbitrarily set and change the parameters.

The animation data compression unit 103 compresses the data while changing the compression ratio for each of the channels classified by the animation data classification unit 101, on the basis of the priorities of the respective channels which are determined by the animation data priority determination unit 102.

As an example of data compression, there is a method of thinning out the keyframe data in the time axis direction, starting from the channel of the lowest priority in ascending order. Further, there is another method of degrading the precision of quantization on the components of the data, starting from the channel of the lowest priority in ascending order.

The animation data compression apparatus 100 is constituted by software under control of a program, in a computer unit such as a work station, a personal computer, a game machine, etc. However, it may be constituted by hardware.

The animation data compression apparatus 100 may have an animation data generation unit (not shown), or an animation data generation unit (not shown) may be disposed outside the animation data compression apparatus 100. The animation data generation unit cuts an animation data part out of data obtained by an existing animation data file, a commercially available animation formation/edition tool, or a motion capture system, and generates animation data having a time axis. The animation data so generated is input to the animation data classification unit 101.

Next, a description will be given of the operation of the animation data compression apparatus 100 according to the first embodiment. In this first embodiment, it is premised that animation data to be input to the apparatus 100 is operation data of a 3D CG character.

Figure 8:
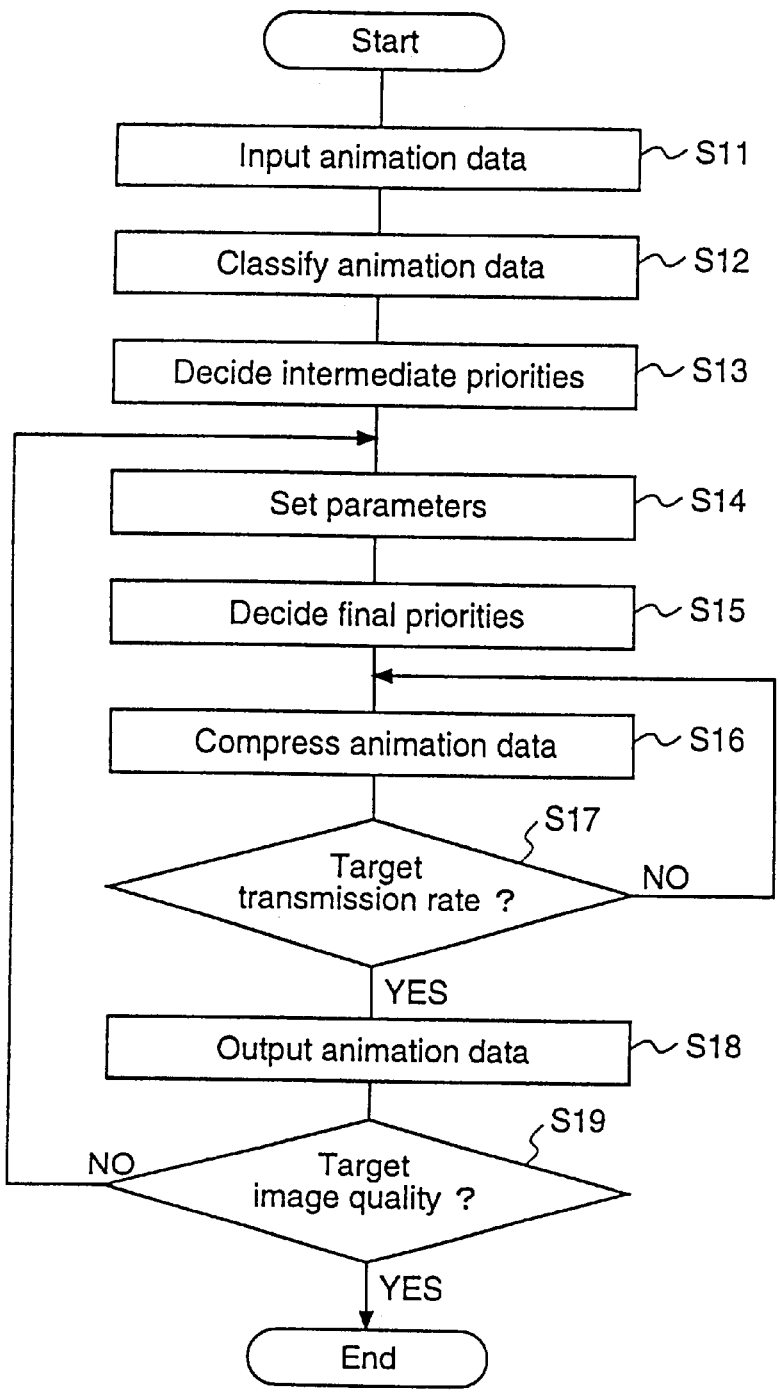
FIG. 8 is a flowchart for explaining the operation of the animation data compression apparatus according to the first embodiment.

FIG. 8 is a flowchart illustrating the operation of the animation data compression apparatus 100 according to the first embodiment.

Initially, in step S11, animation data generated by the animation data generation unit (not shown) is input to the animation data classification unit 101.

Since, in the animation data compression method according to the first embodiment, compression of all input data is carried out using the determined priorities, it is desired that the input data does not have a major change in "the positional relationship between the viewpoint and the CG objects" or in "the amounts of change in the CG objects per unit time", in the middle of the data. When the priorities are determined on the basis of only "the hierarchical structure of the CG scene", any input data may be used as long as there is no occurrence or disappearance of a channel in the middle of the data.

Next, in step S12, the animation data classification unit 101 classifies the inputted animation data into data of channel units.

In step S13, the animation data priority determination unit 102 determines intermediate priorities of the respective channels classified in step S12. This determination of priorities is performed on the basis of "the hierarchical structure of the CG scene", "the positional relationship between the viewpoint and the CG objects", and "the amounts of change in the CG objects per unit time".

In step S14, the user sets parameters, which are to be used for the determination of priorities, in the animation data priority determination unit 102. As initial parameters, predetermined initial values are used because the user cannot carry out setting of parameters after confirming an animation scene which has not yet been outputted.

In step S15, the animation data priority determination unit 102 performs weighted addition of the respective intermediate priorities determined in step S13, using the parameters set in step S14, thereby determining final priorities.

For example, when the user sets parameters ($\alpha$, $\beta$, $\gamma$) in step S14 and the animation data priority determination unit 102 determines intermediate priorities P1, P2, and P3 of the respective channels on the basis of "the hierarchical structure of the CG scene", "the positional relationship between the viewpoint and the CG objects", and "the amounts of change in the CG objects per unit time" in step S13, final priorities P of the respective channels are determined in step S15 as follows.

$$P = \alpha \cdot P1 + \beta \cdot P2 + \gamma \cdot P3 \quad (1)$$

Thereafter, in step S16, the animation data compression unit 103 compresses the entire animation data while changing the compression ratio channel by channel, on the basis of the priorities P of the respective channels determined in step S15.

For example, in the first time, one piece of data is extracted from the keyframe data of the channel having the lowest priority. In the second time, another one piece of data is extracted from the keyframe data of the channel having the lowest priority and, further, one piece of data is extracted from the keyframe data of the channel having the second-lowest priority. Thereafter, the above process is repeated.

Alternatively, in the first time, one piece of data is extracted from the keyframe data of the channel having the lowest priority and, in the second time, one piece of data is extracted from the keyframe data of the channel having the second-lowest priority. Thereafter, the above process is repeated and, when reaching the channel of the highest priority, the process returns to a process of extracting one piece of data from the keyframe data of the channel having the lowest priority. Thereafter, the above process is repeated. When extracting one piece of data from each channel, data having the smallest differences from the previous and subsequent data is selected.

In step S17, the animation data compression unit 103 decides whether the transmission rate of the animation data compressed in step S16 is lower than a target transmission rate or not. When it is not lower than the target transmission rate, the operation returns to step S16. When it is lower than the target transmission rate, the operation proceeds to step S18. The decision as to whether the data transmission rate is lower than the target transmission rate or not is carried out only when the animation data is stream data. When the animation data is not stream data but file data, the animation data compression unit 103 decides in step S17 whether the amount of file data is lower than a target amount of data or not.

In step S18, compressed animation data is output and displayed on, for example, a monitor (not shown), whereby the user can confirm the animation scene.

In step S19, the user confirms the animation data outputted in step S18, and decides whether a target picture quality is achieved or not. When the target image quality is achieved, the operation is ended. When the target image quality is not achieved (e.g., when the motion of an important character is very stiff), the operation returns to step S14, wherein setting of parameters is performed again. The processes in steps S14 through S19 are repeated until the user decides that the target image quality is achieved.

As described above, in the apparatus and method for compressing animation data according to the first embodiment, priorities are determined on the basis of "the hierarchical structure of the CG scene", "the positional relationship between the viewpoint and the CG objects", and "the amounts of change in the CG objects per unit time", and animation data is compressed according to the priorities. Thereby, degradation in smoothness of animation scene, which is caused by that the animation data is transmitted through a narrow-band network, is minimized. Further, the user can change the parameters used for determining the final priorities from the intermediate priorities, while viewing the outputted animation scene. Therefore, the user can select more appropriate parameters, resulting in animation scene with smoother motion.

While in this first embodiment three kinds of intermediate priorities are employed, the intermediate priorities are not restricted to three kinds. One, two, four, or more kinds of intermediate priorities may be used. When using one kind of intermediate priority, the intermediate priorities are identical to the final priorities. Further, to obtain the final priorities, parameters as many as the number of the kinds of the intermediate priorities are used.

Embodiment 2

Hereinafter, an animation data compression apparatus and an animation data compression method according to a second embodiment of the invention will be described with reference to the drawings. The animation data compression apparatus according to the second embodiment principally compresses stream data, and outputs compressed data.

Figure 9:
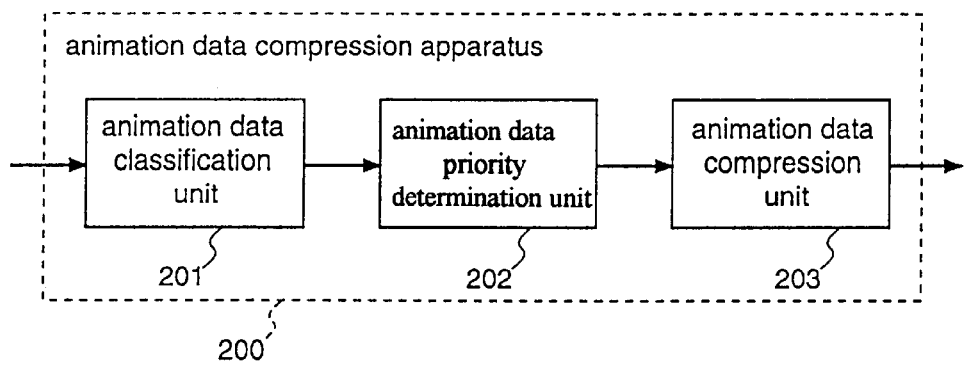
FIG. 9 is a block diagram illustrating the construction of an animation data compression apparatus according to a second embodiment of the present invention.

FIG. 9 is a block diagram illustrating the construction of an animation compression apparatus 200 according to the second embodiment.

With reference to FIG. 9, the animation data compression apparatus 200 comprises an animation data classification unit 201, an animation data priority determination unit 202, and an animation data compression unit 203. The animation data classification unit 201, the animation data priority determination unit 202, and the animation data compression unit 203 are identical to the corresponding units 101, 102, and 103 according to the first embodiment, respectively, except that animation data (stream data) inputted to the animation data compression apparatus 200 is processed packet by packet. Therefore, repeated description is not necessary.

Next, the operation of the animation data compression apparatus 200 will be described.

Figure 10:
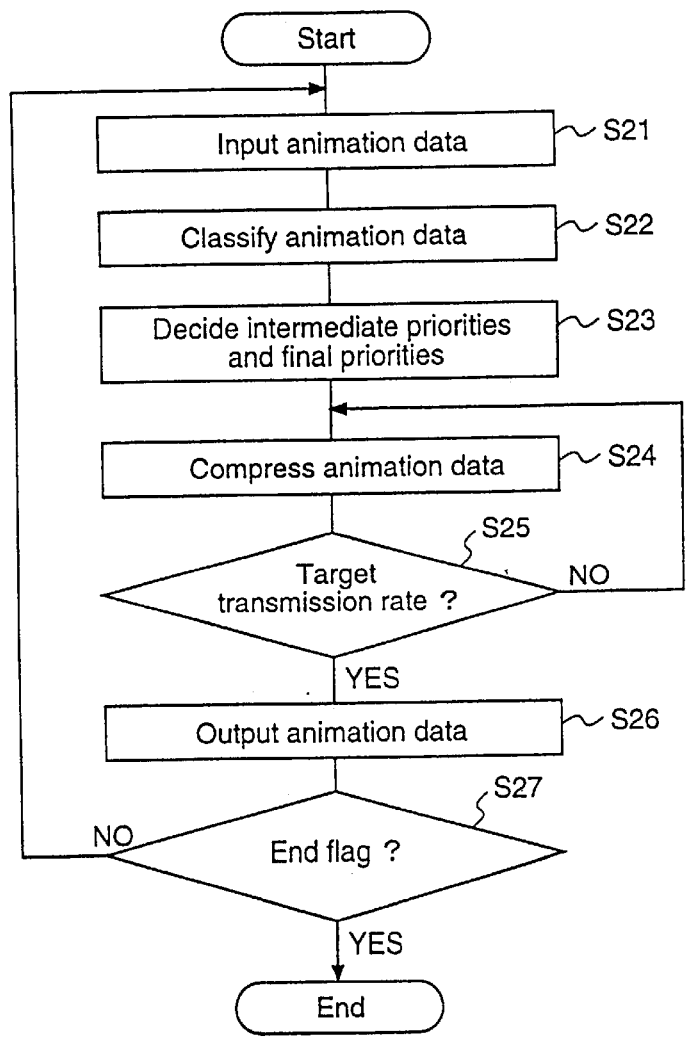
FIG. 10 is a flowchart for explaining the operation of the animation data compression apparatus according to the second embodiment.
Figure 11:
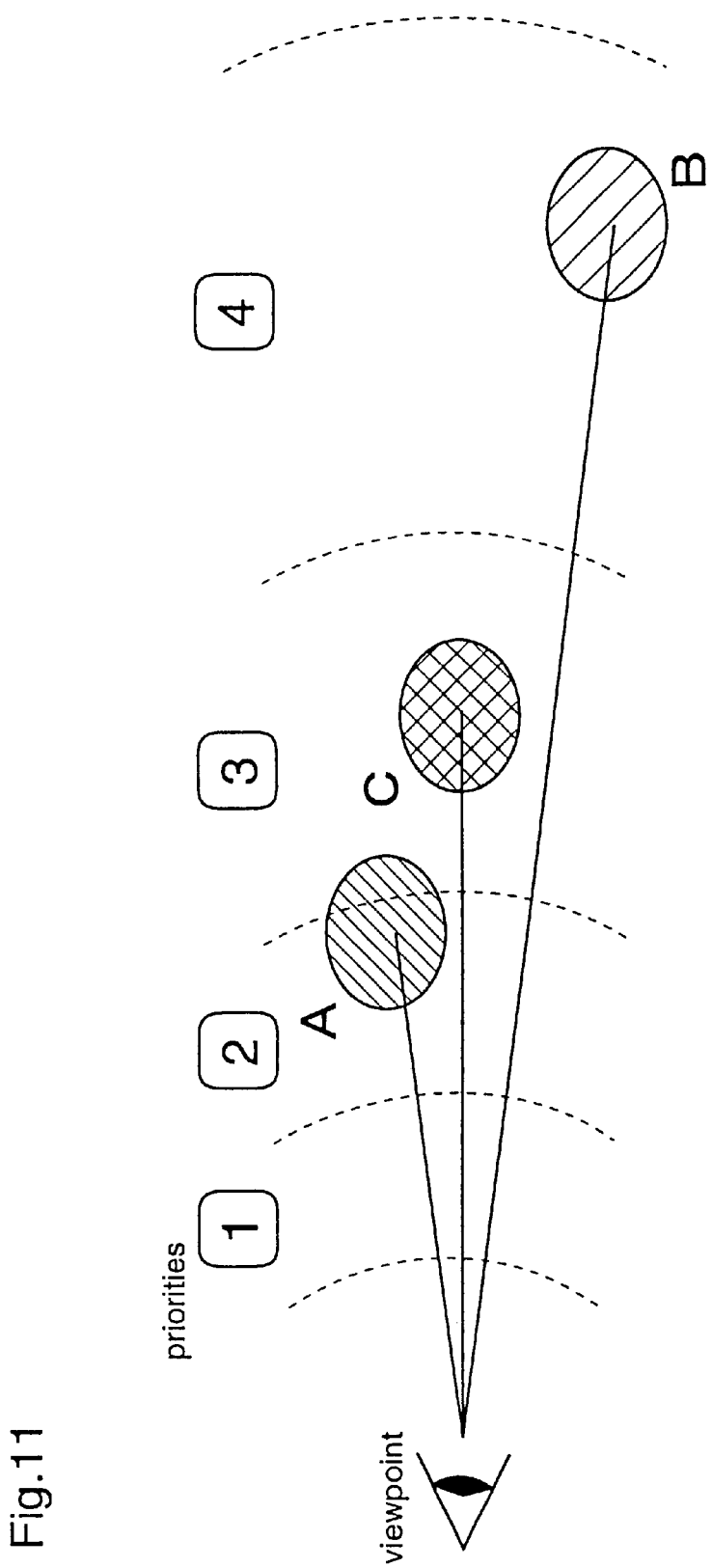
FIG. 11 is a diagram illustrating the positional relationship between the viewpoint and CG objects according to the second embodiment.

FIG. 10 is a flowchart illustrating the operation of the animation data compression apparatus 200.

Initially, in step S21, data packets of animation data (stream data) generated by an animation data generation unit (not shown) are input to the animation data classification unit 201.

Next, in step S22, the animation data classification unit 201 classifies the inputted animation data into data in channel units.

In step S23, the animation data priority determination unit 202 determines intermediate priorities of the respective channels classified in step S22, on the basis of "the hierarchical structure of the CG scene", "the positional relationship between the viewpoint and the CG objects", and "the amounts of change in the CG objects per unit time". Then, the respective intermediate priorities so obtained are subjected to weighted addition according to formula (1) described for the first embodiment, thereby determining the final priorities. Parameters to be used for the determination of priorities have previously been set on the animation data priority determination unit 202.

In step S24, the animation data compression unit 203 compresses the animation data while changing the compression ratio, channel by channel, on the basis of the priorities of the respective channels determined in step S23.

In step S25, the animation data compression unit 203 decides whether the transmission rate of the animation data compressed in step S24 is lower than a target transmission rate or not. When it is not lower than the target transmission rate, the, operation returns to step S24. When it is lower than the target transmission rate, the operation goes to step S26.

In step S26, data packets of the compressed animation data are output, and the outputted data packets are transmitted to a communication line (not shown).

In step S27, the animation data classification unit 201 decides whether an end flag is inputted or not. When an end flag is inputted, the operation is ended because the end flag indicates that the animation data (stream data) on which compression is carried out is terminated. When no end flag is inputted, the operation returns to step S21 because there are subsequent packets of the animation data. Thereafter, the processes in steps S21 through S27 are repeated.

For example, when the positional relationship between the viewpoint and the respective CG objects changes from FIG. 6 to FIG. 11, the priority of CG object B changes from "3" to "4" and the priority of CG object C changes from "4" to "3". However, according to the animation data compression method of this second embodiment, since the priorities are determined packet by packet, the priorities can be changed packet by packet according to the change in the positional relationship between the CG objects.

As described above, in the apparatus and method for compressing animation data according to the second embodiment, classification of animation data, determination of priorities, and data compression are performed packet by packet. Therefore, in addition to the effects achieved by the first embodiment, appropriate priorities based on the data packets can be determined even when processing animation data in which the distance between a CG object and the viewpoint changes significantly or animation data in which the amount of change in a CG object per unit time changes with time. As the result, the smoothness of animation scene is further improved.

Embodiment 3

Hereinafter, a network server according to a third embodiment of the present invention will be described with reference to the drawings. The network server according to the third embodiment employs any of the animation data compression apparatuses or methods according to the aforementioned embodiments.

Figure 12:
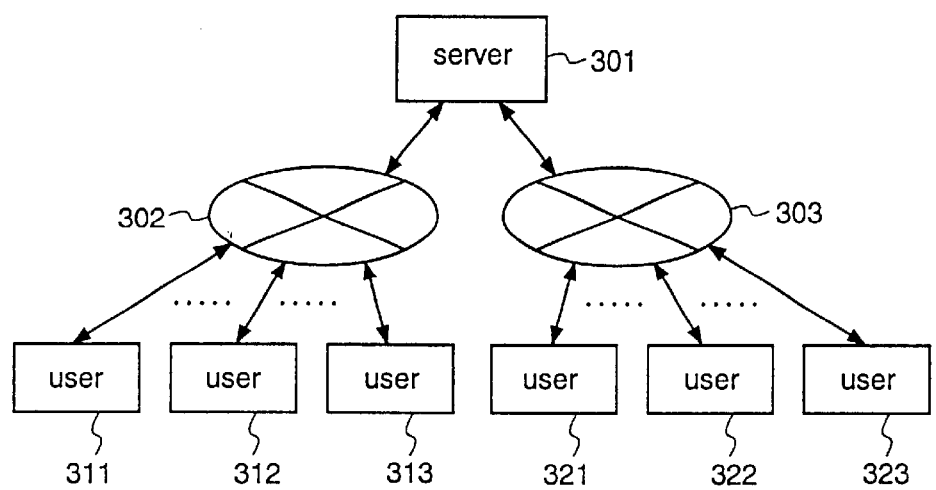
FIG. 12 is a diagram illustrating the construction of a network according to a third embodiment of the present invention.

FIG. 12 shows the construction of a network according to the third embodiment.

In FIG. 12, the network is composed of a server 301 for distributing contents, a wide-band network 302, a narrow-band network 303, users 311~313, and users 321~323.

The server 301 receives, from a provider of CG contents, the CG contents and an address of a destination of the CG contents. Then, the server 301 distributes the CG contents to the destination address. If the CG contents will be transmitted through the narrow-band network 303, since the compression ratio must be increased, data compression is performed by using the animation data compression method according to the present invention, and the compressed data is distributed.

As the wide-band network 302, for example, an optical fiber network, a CATV network, a xDSL network, or the like is employed. As the narrow-band network 303, for example, a network using a communication line or a telephone line, such as a handy phone, is employed.

The users 311~313 are connected to the wide-band network 302, and the users 321~323 are connected to the narrow-band network 303.

Next, a description will be given of data distribution using the animation data compression method of the present invention.

It is assumed that the user 311 is a provider of CG contents. The user 311 transmits created 3D CG contents data and a destination address to which the contents data is to be distributed, through the wide-band network 302, to the server 301.

On receipt of the CG contents data and the destination address, the server 301 transmits the CG contents data to the destination address. When the user of the destination address is a user of the wide-band network, the animation data included in the contents data can be transmitted as a data stream. However, when the user of the destination address is a user of the narrow-band network, the server 301 compresses the animation data included in the contents data by using the animation data compression method according to any of the first and second embodiments of the invention, and distributes the compressed animation data as a data stream to the user of the narrow-band network 303.

The server 301 charges for the service, i.e., distribution of 3D CG contents data, on each of the users provided with the service, by using credit cards or the like. The server 301 pays a predetermined ratio of the charge to, the user 311 as a provider of the CG contents.

As described above, the network server according to the third embodiment compresses animation data included in CG contents data provided by a contents provider, using an animation data compression method according to any of the first and second embodiments, and distributes the compressed data to a user of the narrow-band network 303. Therefore, even when the bit rate for transmitting the animation, data as stream data is larger than the transmission bandwidth, the server can distribute the animation data in real time without overflow of data. Furthermore, the server can compress the animation data without degrading smoothness of animation scene.

What is claimed is:

1. An animation data compression method for compressing animation data of CG objects having a hierarchical structure which comprises a priority of compression, said method comprising:
   determining a priority of compression for each component of CG scene data;
   setting data belonging to a component of the CG scene data having a lowest priority of compression as compression object data, the lowest priority of compression being determined by said determining of a priority of compression for each component of the CG scene data;
   compressing the compression object data set by said setting of the data belonging to the component of the CG scene data having the lowest priority of compression;
   calculating a rate of the data compressed by said compressing of the compression object data; and
   comparing the rate calculated by said calculating of the rate to a target transfer rate, wherein
      when the calculated rate is lower than the target transfer rate as a result of said comparing, the compressed data are outputted, and
      when the calculated rate is higher than the target transfer rate as a result of said comparing, the compression object data set by said setting of the data belonging to the component of the CG scene data having the lowest priority of compression are replaced by data belonging to a component of the CG scene data having a second lowest priority of compression, the second lowest priority of compression being determined by said determining of a priority of compression for each component of the CG scene data.

2. The animation data compression method of claim 1, wherein the animation data of CG objects represents an animation scene of three-dimensional CG.

3. The animation data compression method of claim 2, wherein said determining a priority of compression for each component of the CG scene data comprises further determining the priority of compression for each component of the CG scene data based on a positional relationship between a viewpoint and the CG objects.

4. The animation data compression method of claim 1, wherein the animation data of CG objects includes multidimensional stream data.

5. The animation data compression method of claim 4, wherein the multidimensional stream data comprises a plurality of data packets, and said determining a priority of compression for each component of the CG scene data comprises determining a priority for each of the data packets of the multidimensional stream data.

6. The animation data compression method of claim 1, wherein the animation data of CG objects includes multidimensional stream data representing an animation scene of three-dimensional CG.

7. The animation data compression method of claim 1, wherein said determining a priority of compression for each component of the CG scene data comprises determining the priority of compression for each component of the CG scene data based on the hierarchical structure of the CG objects.

8. The animation data compression method of claim 1, wherein said determining a priority of compression for each component of the CG scene data comprises further determining the priority of compression for each component of the CG scene data based on amounts of change in the CG objects per unit time.

9. The animation data compression method of claim 1, wherein said determining a priority of compression for each component of the CG scene data comprises:
   determining respective intermediate priorities of compression for the CG scene data based on at least two of
      a hierarchical structure of a CG scene,
      a positional relationship between a viewpoint and the CG objects, and
      amounts of change in the CG objects per unit time; and
   performing weighted addition of the respective intermediate priorities of compression to determine final priorities of compression for each component of the CG scene data.

10. An animation data compression apparatus for compressing animation data of CG objects having a hierarchical structure which comprises a priority of compression, said apparatus comprising:
   an animation data priority determination unit operable to determine a priority of compression for each component of CG scene data, and to set data belonging to a component of the CG scene data having a determined lowest priority of compression as compression object data; and
   an animation data compression unit operable to
      compress the compression object data set by said animation data priority determination unit,
      calculate a rate of the compressed compression object data, and
      compare the calculated rate to a target transfer rate, wherein
         when the calculated rate is lower than the target transfer rate, said animation data compression unit is operable to output the compressed compression object data, and
         when the calculated rate is higher than the target transfer rate, said animation data compression unit is operable to replace the compression object data set by said animation data priority determination unit with data belonging to a component of the CG scene data having a second lowest priority of compression, wherein the component of the CG scene data having the second lowest priority of compression is determined by said animation data priority determination unit.

11. The animation data compression apparatus of claim 10, further comprising an animation data classification unit operable to classify each component of the CG scene data into a respective animation data for each joint of the hierarchical structure of the CG objects.

12. The animation data compression apparatus of claim 11, wherein said animation data compression unit is operable to compress the classified animation data based on the respective priorities at a compression ratio respective to each classified animation data.

13. The animation data compression apparatus of claim 10, wherein the animation data of CG objects represents an animation scene of three-dimensional CG.

14. The animation data compression apparatus of claim 13, wherein said animation data priority determination unit further determines the priority of compression for each component of the CG scene data based on a positional relationship between a viewpoint and the CG objects.

15. The animation data compression apparatus of claim 10, wherein the animation data of CG objects includes multidimensional stream data.

16. The animation data compression apparatus of claim 15, wherein the multidimensional stream data comprises a plurality of data packets, and said animation data priority determination unit is operable to determine a priority for each of the plurality of data packets of the multidimensional stream data.

17. The animation data compression apparatus of claim 10, wherein the animation data of CG objects includes multidimensional stream data representing an animation scene of three-dimensional CG.

18. The animation data compression apparatus of claim 10, wherein the animation data priority determination unit determines a priority of compression for each component of the CG scene data based on the hierarchical structure of the CG objects.

19. The animation data compression apparatus of claim 10, wherein said animation data priority determination unit further determines the priority of compression for each component of the CG scene data based on amounts of change in the CG objects per unit time.

20. The animation data compression apparatus of claim 10, wherein said animation data priority determination unit is operable to:
  determine respective intermediate priorities of compression for the CG scene data based on at least two of
    a hierarchical structure of a CG scene,
    a positional relationship between a viewpoint and CG objects, and
    amounts of change in the CG objects per unit time; and
  perform weighted addition of the respective intermediate priorities of compression for the CG scene data to determine final respective priorities of compression for each component of the CG scene data.

21. A network server for distributing CG contents including animation data, said network server comprising said animation data compression apparatus of claim 10, wherein said animation data compression apparatus is operable to compress animation data, and said network server is operable to distribute the compressed animation data.

22. A recording medium having a program executable on a computer device recorded thereon, said program executing a method of compressing animation data of CG objects having a hierarchical structure which comprises a priority of compression, said method comprising:
  determining a priority of compression for each component of CG scene data;
  setting data belonging to a component of the CG scene data having a lowest priority of compression as compression object data, the lowest priority of compression being determined by said determining of a priority of compression for each component of the CG scene data;
  compressing the compression object data set by said setting of the data belonging to the component of the CG scene data having the lowest priority of compression;
  calculating a rate of the data compressed by said compressing of the compression object data; and
  comparing the rate calculated by said calculating of the rate to a target transfer rate, wherein
    when the calculated rate is lower than the target transfer rate as a result of said comparing, the compressed data are outputted, and
    when the calculated rate is higher than the target transfer rate as a result of said comparing, the compression object data set by said setting of the data belonging to the component of the CG scene data having the lowest priority of compression are replaced by data belonging to a component of the CG scene data having a second lowest priority of compression, the second lowest priority of compression being determined by said determining of a priority of compression for each component of the CG scene data.

23. The recording medium of claim 22, wherein the animation data of CG objects represents an animation scene of three-dimensional CG.

24. The recording medium of claim 23, wherein said determining a priority of compression for each component of the CG scene data comprises further determining the priority of compression for each component of the CG scene data based on a positional relationship between a viewpoint and the CG objects.

25. The recording medium of claim 22, wherein the animation data of CG objects includes multidimensional stream data.

26. The recording medium of claim 25, wherein the multidimensional stream data comprises a plurality of data packets, and said determining a priority of compression for each component of the CG scene data comprises determining a priority for each of the data packets of the multidimensional stream data.

27. The recording medium of claim 22, wherein the animation data of CG objects includes multidimensional stream data representing an animation scene of three-dimensional CG.

28. The recording medium of claim 22, wherein said determining a priority of compression for each component of the CG scene data comprises determining the priority of compression for each component of the CG scene data based on the hierarchical structure of the CG objects.

29. The recording medium of claim 22, wherein said determining a priority of compression for each component of the CG scene data comprises further determining the priority of compression for each component of the CG scene data based on amounts of change in the CG objects per unit time.

30. The recording medium of claim 22, wherein said determining a priority of compression for each component of the CG scene data comprises:

determining respective intermediate priorities of compression for the CG scene data based on at least two of
- a hierarchical structure of a CG scene,
- a positional relationship between a viewpoint and the CG objects, and
- amounts of change in the CG objects per unit time; and performing weighted addition of the respective intermediate priorities of compression to determine final priorities of compression for each component of the CG scene data.

* * * * *

UNITED STATES PATENT AND TRADEMARK OFFICE
CERTIFICATE OF CORRECTION

PATENT NO. : 6,741,252 B2
DATED : May 25, 2004
INVENTOR(S) : Toshiki Hijiri et al.

It is certified that error appears in the above-identified patent and that said Letters Patent is hereby corrected as shown below:

<u>Title page,</u>
Item [56], References Cited, U.S. PATENT DOCUMENTS, please add:
-- 4,600,919A * 7/1986 Stern………..345/473 --

Signed and Sealed this

Tenth Day of August, 2004

JON W. DUDAS
*Acting Director of the United States Patent and Trademark Office*